June 23, 1931.  C. PEARSON  1,811,062
RAKE
Filed May 20, 1929  3 Sheets-Sheet 1

Inventor
Charles Pearson
By H.P. Daniato
Atty.

June 23, 1931.  C. PEARSON  1,811,062
RAKE
Filed May 20, 1929   3 Sheets-Sheet 2

Inventor
Charles Pearson
By W. P. Davint
Atty.

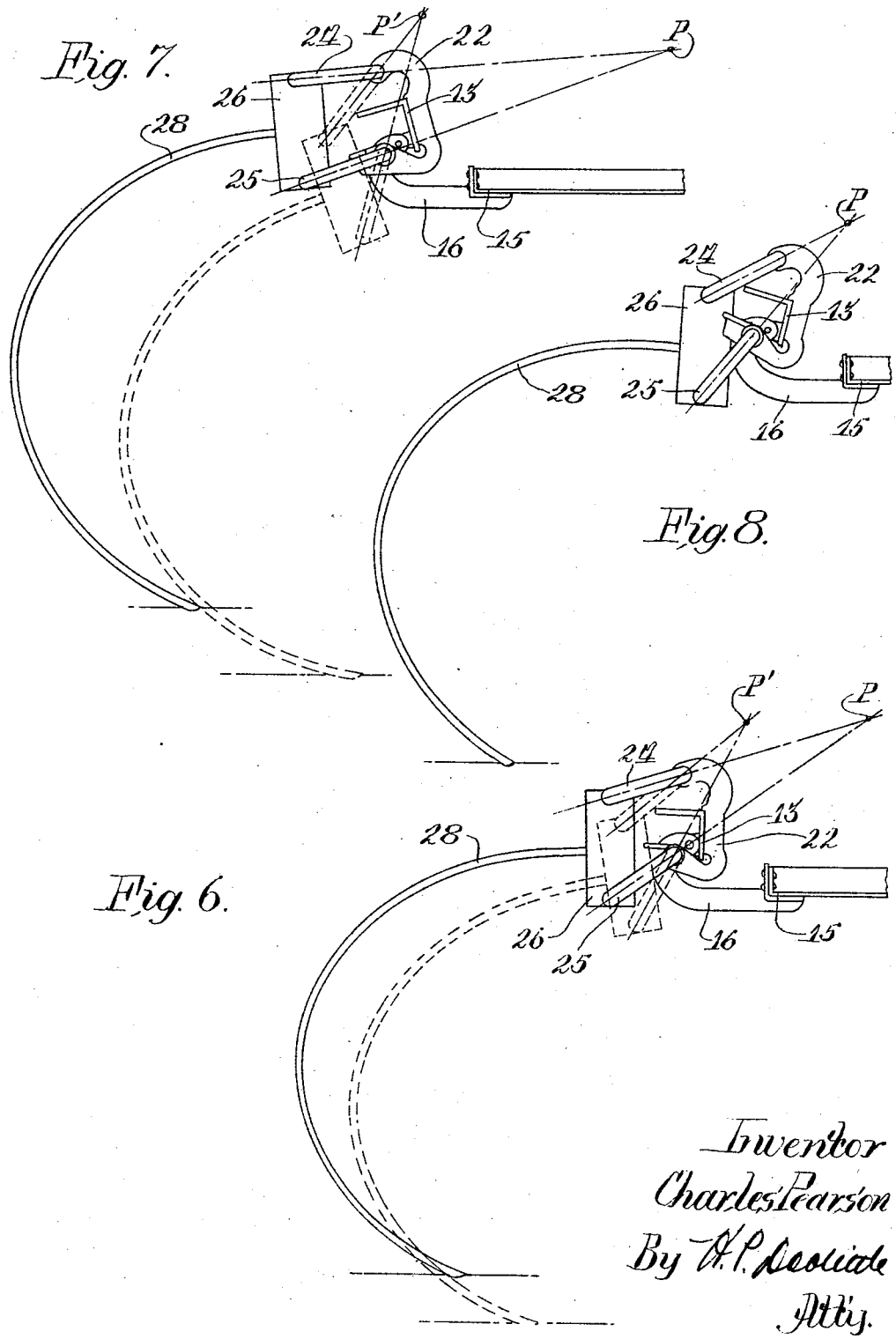

Patented June 23, 1931

1,811,062

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

RAKE

Application filed May 20, 1929. Serial No. 364,383.

This invention relates to rakes.

Particularly, it relates to dump rakes. Such rakes are well known in the art, and are commonly employed in haying to rake hay and gather the same in bunches.

In connection with the campaign now being waged in the corn belt to eliminate the corn borer, it has been proposed to rake corn stalks after the harvest and gather the same in bunches which can be conveniently burned, and to this extent aid in lessening the ravages of this pest. It has been found that dump rakes designed for haying operations are not entirely satisfactory in gathering corn stalks, for several reasons. For example, the hay dump rake is too light to rake a crop as heavy as corn stalks. Further, as the corn fields are decidedly rough and uneven, the hay dump rake cannot do a very clean job of gathering.

Therefore, it is the primary object of this invention to provide a dump rake of special construction that will adapt the same for operation in corn fields to rake and gather corn stalks.

Another object is to provide a plurality of sets of raking teeth that may independently drop into hollows to make a clean job of gathering.

A further object is to provide an adjustment for a tiltable rake head or finger bar to which teeth or fingers are pivotally connected in a manner to cause such adjustment to change the location of the working pivot for the teeth to regulate the tooth pressure on the ground.

Another very important object is to provide teeth so mounted that when dropped below the normal ground line working position, from the initially set position of the finger bar, they will be automatically restored to normal position with a minimum of resistance, because of the shifting of the theoretical or working pivot for the teeth.

Other important objects will make themselves apparent as this disclosure progresses.

Briefly, these objects are accomplished in a sulky dump rake having a transverse, tooth carrying finger bar tiltable about the axis of the carrying wheels. The finger bar, at spaced intervals, carries brackets in which are rockably mounted for movement, pairs of separate linkages that carry blocks to which in turn are connected gangs or sets of gathering fingers or teeth. Each set of teeth is independently floatable up or down to accommodate itself to ground contour, to make a clean raking job. A clearer rod is stationarily arranged between each gang of teeth to aid in dumping an accumulated load.

By means of an adjustment the finger beam may be rocked and given an initially set position to regulate tooth pressure. The axial lines of the linkages for carrying the blocks are arranged to intersect at a point which constitutes an instantaneous or theoretical working pivot for the teeth that automatically shifts when the teeth drop below the normal set and ground line to effect a restoration of the teeth to normal position with a minimum of resistance under the draft force.

In the drawings showing an illustrative embodiment of the invention,—

Figure 6 is a diagram to show how the working pivot shifts, when the teeth drop, with the finger beam initially set in a vertical position;

Figure 7 is a similar diagram but showing what takes place when the finger beam has been set to an initial position slightly tilted to the rear of a vertical line; and, Figure 8 is a similar diagram showing the finger beam adjusted to a position tilted forwardly of the vertical.

Figure 1:
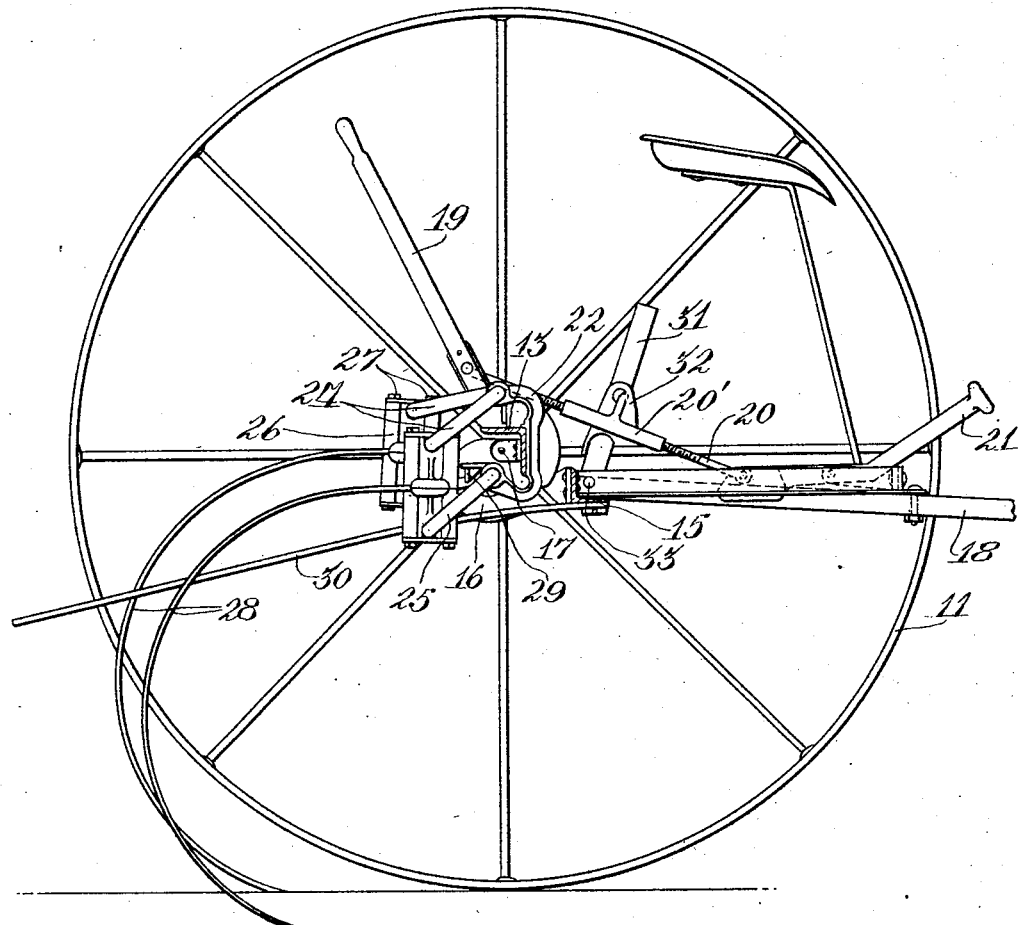
Figure 1 is a side elevational view, with the nearest wheel removed for the sake of clearness, as would be seen along the line 1—1, looking in the direction of the arrows as shown in Figure 2.

One of the carrying wheels is shown at 11 journaled upon a stub axle 12 secured in the usual way to the rake carrying head 13, which is rockable on the carrying wheel axis. A usual form of ratchet hub 14 is also provided to take care of differential wheel movement, on turns.

A standard draft frame appears at 15, the same being connected to goose-necks 16, which are pivotally connected at 17 to the rake head 13. Thills 18 are secured to the under side of the draft frame.

A hand lever 19 is mounted on the finger bar 13 to rock the same. Said lever has connected thereto, the usual toggle link 20, including the turn buckle adjuster 20' which locks the bar against tilting movement when raking. The toggle link 20 includes the usual foot lever 21. For a further disclosure of this conventional lever mechanism, reference should be made to applicant's prior Patent No. 1,000,438 of August 15, 1911, on a hay rake.

The present improvements relate to a novel form of gathering or raking structure to adapt machines of this type for use in raking corn stalks, as has previously been indicated.

Accordingly, the front side of the finger bar 13, which in practice will be an angle bar, is provided at spaced intervals with a plurality of brackets 22. Each bracket is made secure to the bar, and includes upper and lower bearing extensions 23 formed integrally with the bracket. The upper bearings 23 in adjacent brackets 22 carry, rockably, the ends of upper linkages in the form of cranks 24, while the lower bearings 23 in adjacent brackets 22 carry the ends of similar, lower linkages 25. Thus, it will be understood that adjacent bearings in adjacent pairs of brackets rockably carry upper and lower, separate devices such as cranks. The bight portion of each upper crank 24 is rockably journaled in the top part of a split block 26, and the bight portion of each lower crank 25 is similarly carried in the bottom part of the same block 26. Bolts 27 are provided for clamping a set or gang of heavy tines or rake teeth 28 between the top and bottom of each block 26.

From this description it will now be clear that in the illustrative embodiment herein shown the raking teeth are arranged in separately mounted gangs or sets, each independently floatable up, or dropable down, individually to conform with ground irregularities because of the character of their connection to the finger bar. This connection embodies substantially parallelly moving pairs of cranks and the blocks 26, which cause the tine sets or gangs to float or drop along arcs of circles which are substantially in parallel, vertical lines. This is very important for it prevents the teeth from digging into ground obstructions, for the forces acting as a result of such ground resistance act upon the crank mechanism in a manner to cause the teeth to ride vertically up and away from the obstruction, thereby preventing injury to the raking teeth.

Figure 4:
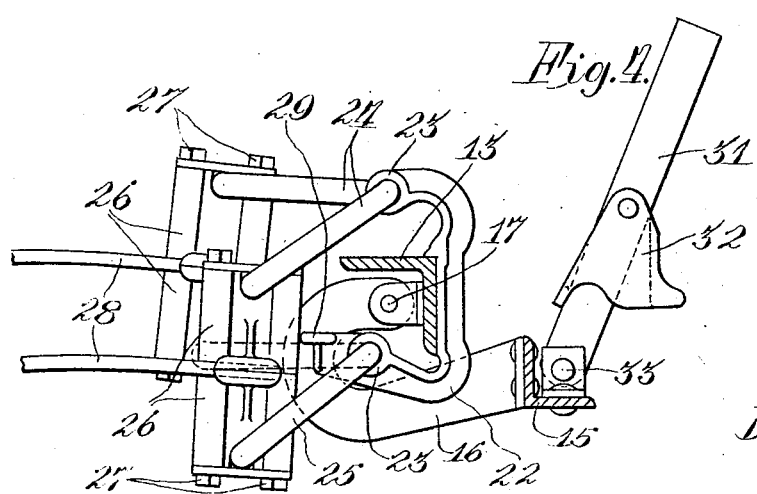
Figure 4 is a side, elevational view, partly in section, as seen along the line 1—1 of Figure 2, and on an enlarged scale, showing the parts as they appear when the rake gangs are in raking position.

In Figures 1 and 4 is illustrated the relative position of the parts, when a set or gang of teeth has dropped into a gulley independently of its neighbor gangs. The down movement of any gang is limited when the crank 24 contacts the angle bar 13.

The upward float is limited when a lower crank 25 engages a projection 29 formed on each bracket 22 for that purpose. See dotted line showing in Figure 4.

Clearer bars 30 are made fast to the under-side of the draft frame 15 in a manner to extend rearwardly, so that a clearer bar is arranged between adjacent gangs of raking teeth. When an accumulated load of corn stalks is dumped by raising the teeth, these clearer bars act to clear the load from the teeth.

Figure 2:
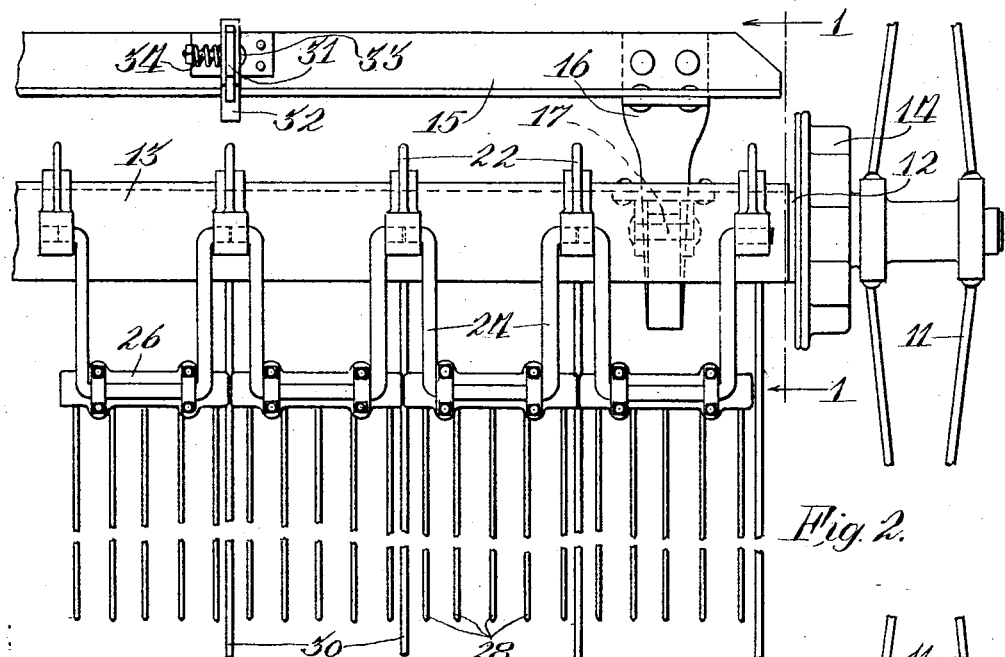
Figure 2 is an enlarged, top plan view of one end of the rake.
Figure 3:
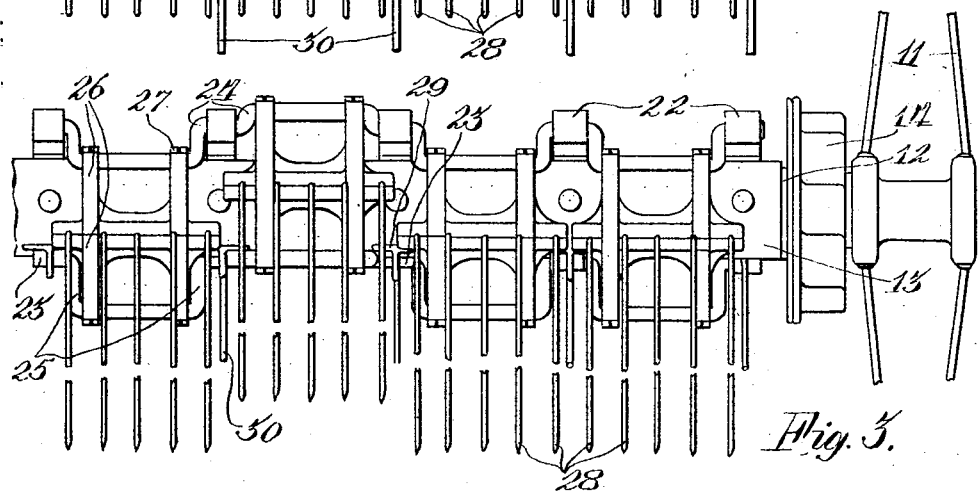
Figure 3 is a rear, elevational view of the same structure shown in Figure 2.
Figure 5:
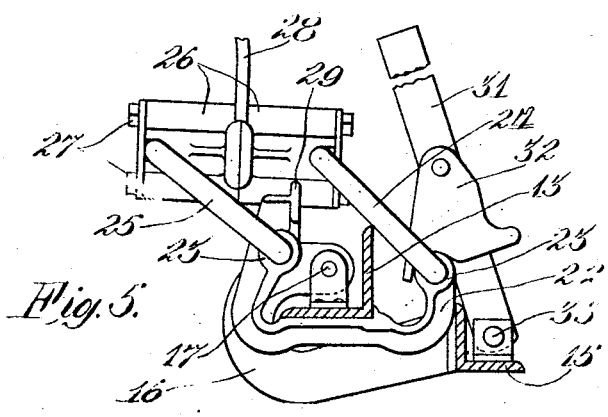
Figure 5 is a similar view, but showing the parts locked in an up position for transport of the rake.

When it is desired to transport the rake on its own carrying wheels, it is advisable to raise all of the teeth out of ground contacting position. This is accomplished by the hand lever 19, or by the draft dump means, not shown, appearing in Patent 1,000,438, heretofore mentioned, which rocks the rake head or finger bar to raise the teeth to the position shown in Figure 5. When so raised, a manually actuated lever 31 is swung back from its normal forward position to cause a latch 32 to hook over a bearing 23 to support and lock the teeth in this raised position. Said lever 31 is pivoted at 33 to the frame 15 and is held in any set position, frictionally, by means of a spring 34, as generally shown in Figure 2.

The draft dump means of applicant's prior patent, mentioned, may, of course, also be provided for dumping the rake in the field, as will readily be understood.

The turnbuckle 20' accessible from the operator's seat may be turned to tilt the finger bar 15 to give the fingers or rake teeth any desired pressure contact on the ground. Adjustment, in this fashion, of the head or bar 13 also tilts the brackets 22.

Let us assume that the turnbuckle 20' has been used to bring the finger bar to a vertical line position as appears in Figure 6. For certain field conditions this set will give the desired tooth pressure. Of course, no direct pressure is applied. The axial lines of the links or cranks 24, 25 intersect, when the teeth are resting on the ground line, as shown in full lines at the point P. This point represents the instantaneous or working pivot of the teeth, which in practice, in a full size rake, is located normally about ten inches forwardly of the beam 26 and about eight inches above the thill frame. When the teeth run below this ground or wheel base line, as appears in the dotted lines, blocks 26 of course, drop along with the center of gravity of the teeth. This drop shifts the pivot to the point P' as a maximum, which is towards the rear and higher up. The resultant component of the mechanical forces now acting on the shifted pivot P', makes it easy for the teeth to regain their normal position on the ground line. The importance of the automatically shifting pivot will thus be appreciated.

In Figure 7 has been illustrated a condition in which the finger bar has been adjusted to an initial position tilted slightly rearwardly of a vertical line, as shown in the full lines. This adjustment automatically shifts the tooth pivot to P about eighteen inches ahead of the finger beam and about five inches over the thill frame, thus providing more pressure on the teeth when raking over the normal ground line. With this condition existent the point shifts automatically to P' toward the finger beam and higher up when teeth drop below the normal ground line, giving less pressure on teeth until the normal position is regained. This dropped position appears in dotted lines.

In Figure 8 the finger beam is tilted to a position forwardly of the vertical, which changes the pivot point P of the teeth over the beam, allowing the teeth to float lightly over the ground or over obstructions.

Thus in a broad aspect the invention provides a means of connecting rake teeth to a beam, which means provides a theoretical working pivot for the teeth, which automatically changes location as the teeth raise or lower over uneven ground. This pivot also changes location when the finger beam is tilted, thus providing more or less tooth pressure on the ground.

In operation, it will now be clear that the provision of separately mounted gangs of rake teeth having independent movement makes for clean raking, as the teeth readily conform with ground irregularities.

Obviously, a single tooth could be pivotally mounted in accordance with this invention as it may not always be desirable to arrange the teeth in sets of gangs.

It will also be apparent now that the improved rake achieves all of the desirable objects heretofore recited.

It is the intention to cover all such changes and modifications of the invention which do not materially depart therefrom, as is indicated by the scope of the appended claims.

What is claimed is:

1. The combination with a rake having a finger bar, of a plurality of sets of rake tooth gangs in which each set is independently and pivotally connected to the bar.

2. The combination with a rake having a tiltable finger beam, of a plurality of sets of rake tooth gangs pivotally connected to the beam, the gangs being movable independently of each other and independently of the beam.

3. In a dump rake, a rake beam, and a plurality of sets of rake tooth gangs, each set connected to the beam for independent up and down movement in the raking position of the teeth.

4. In a dump rake, a rockable finger beam, and a plurality of sets of rake tooth gangs, each set connected to the beam for limited up and down movement independently of each other and independently of the beam.

5. In a dump rake, a beam, a plurality of separate cranks journaled thereon for free pivotal movement, and a gang of rake teeth connected to each crank for up and down movement therewith.

6. In a dump rake, a rockable beam, a plurality of separate cranks journaled on the beam, and a gang of rake teeth connected to each crank for up and down movement independently of the beam.

7. In a dump rake, a rake beam, a plurality of separate cranks journaled end to end on the beam, and a gang of rake teeth mounted on each crank for limited free up and down movement.

8. In a dump rake, a rake beam, separate cranks carried on the beam in end to end relationship and arranged in pairs with the cranks of each pair disposed one above the other along two lines, and a gang of rake teeth carried by each said pair of cranks.

9. In a dump rake, a rake beam, a plurality of brackets mounted on the beam in spaced relationship, each bracket journaling a pair of cranks substantially parallel with each other, and a gang of rake teeth caried by each pair of cranks.

10. In a dump rake, a beam, a plurality of brackets mounted on the beams in spaced relationship, each bracket having a bearing extension above the beam separate cranks journaled in the bracket extensions, and a gang of rake teeth connected to each crank.

11. In a dump rake, a beam, a plurality of brackets mounted on the beam in spaced relationship, each bracket having a bearing extension above the beam and a bearing extension below the beam, separate cranks journaled in the bearing extensions and arranged in pairs, each comprising an upper and a lower crank, and a gang of rake teeth connected to each pair of cranks.

12. In a dump rake, a beam, separate cranks journaled on the beam, a block pivotally carried by each crank, and a gang of rake teeth carried rigidly by each block.

13. In a dump rake, a beam, brackets mounted in spaced relationship on the beam, a pair of cranks journaled in each bracket, a block carried by each pair of cranks, and a gang of rake teeth carried by each block.

14. In a dump rake, a beam, blocks carrying separate gangs of rake teeth, and means pivotally connecting the blocks to the beam in a manner to cause the teeth to raise in arcs of a circle which are substantially vertical lines.

15. In a dump rake, a beam, separate gangs of rake teeth connected to the beam for independent pivotal movement relative to the beam and clearer members between the gangs.

16. In a dump rake, a beam, separate cranks on the beam, a gang of rake teeth connected to each crank, and a clearer member between adjoining gangs.

17. In a dump rake, a beam, separate gangs of rake teeth pivotally connected to the beam for independent movement relative to the beam, means for raising all of the gangs together to transport position, and means for locking the gangs in such position.

18. In a dump rake, a rake beam, brackets carried on the beam in spaced relationship, each bracket having a bearing extension, cranks journaled in the extensions, a gang of rake teeth connected to each crank, means for raising all of the gangs simultaneously to transport position, and a latch member adapted to lock over one of the bearing extensions to retain the parts in such position.

19. In a rake, a beam, a rake tooth, linkage pivotally connecting the tooth to the beam, and means for tilting the beam to an initial set position to regulate the tooth pressure on the ground.

20. In a rake, a beam, a rake tooth, links pivotally connecting the tooth to the beam, means for tilting the beam to an initial set position to regulate the tooth pressure on the ground, said links having converging axes to form a theoretical shiftable working pivot to cause a restoration of the tooth to the normal ground line and initial set position with a minimum of resistance should the tooth drop below its normal position.

21. In a rake, a beam, a rake tooth, links pivotally connecting the tooth to the beam whereby the tooth may fall below the wheel base line on uneven ground, said links having converging axes to form a shiftable theoretical pivot point for the teeth.

22. In a rake, a beam, a rake tooth, spaced links for pivotally connecting the tooth to the beam whereby the tooth may fall below the wheel base line on uneven ground, the axial lines of the spaced links intersecting to form a working pivot which shifts with the rise and fall of the tooth.

23. In a rake, a beam, means pivotally connecting a tooth to the beam so that the tooth may raise and fall over uneven ground, said means including converging axes to form an automatically shifting theoretical working pivot for the tooth.

24. In a rake, a beam, a tooth, and means having converging axes to form a shiftable theoretical working pivot, said means operatively connecting the tooth to the beam.

25. In a rake, a beam, a tooth, and means including a pair of cranks for pivotally connecting the tooth to the beam, the axial lines of the cranks intersecting to form a shiftable working pivot point for the tooth as it rises and falls over uneven ground.

In testimony whereof I affix my signature.

CHARLES PEARSON.